United States Patent [19]
Takahashi et al.

[11] Patent Number: 5,232,521
[45] Date of Patent: Aug. 3, 1993

[54] FLUORIDE FLUX FOR ALUMINUM BRAZING

[75] Inventors: Susumu Takahashi, Yokohama; Mochimasa Zusho, Urawa; Kiichi Kanda, Hiratsuka, all of Japan

[73] Assignee: Kanto Yakin Kogyo K.K., Japan

[21] Appl. No.: 960,017

[22] Filed: Oct. 13, 1992

[30] Foreign Application Priority Data

Oct. 24, 1991 [JP] Japan .................................. 3-342534
Dec. 4, 1991 [JP] Japan .................................. 3-357485

[51] Int. Cl.$^5$ ............................................. B23K 35/34
[52] U.S. Cl. ............................................... 148/26
[58] Field of Search ..................................... 148/26

[56] References Cited

U.S. PATENT DOCUMENTS

| | | | |
|---|---|---|---|
| 3,892,561 | 7/1975 | Takashima | 148/26 |
| 3,936,326 | 2/1976 | Muller | 148/26 |
| 3,951,328 | 4/1976 | Wallace | 148/26 |
| 4,224,086 | 9/1980 | Stokes | 148/26 |
| 5,156,326 | 10/1992 | Gibson | 148/26 |

Primary Examiner—Peter D. Rosenberg
Attorney, Agent, or Firm—Shlesinger, Fitzsimmons & Shlesinger

[57] ABSTRACT

A novel fluoride flux with Li ions which is extermely insoluble to water and thus noncorrosive, and which is excellent especially for use with the brazing of articles made of aluminum alloys containing Mg. A novel method for preparing such fluoride flux by a dry process is also described.

2 Claims, 2 Drawing Sheets

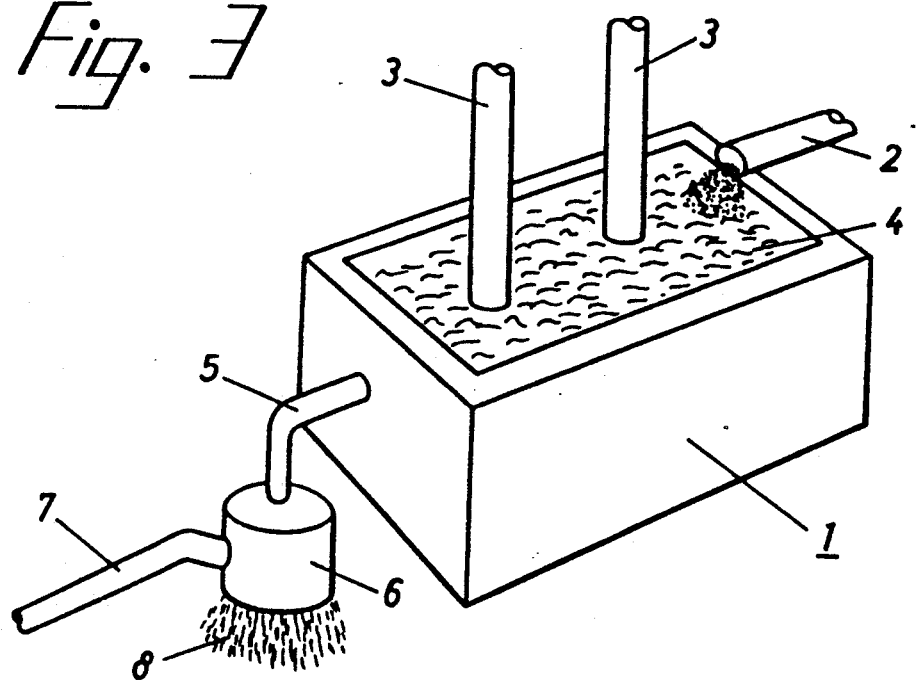
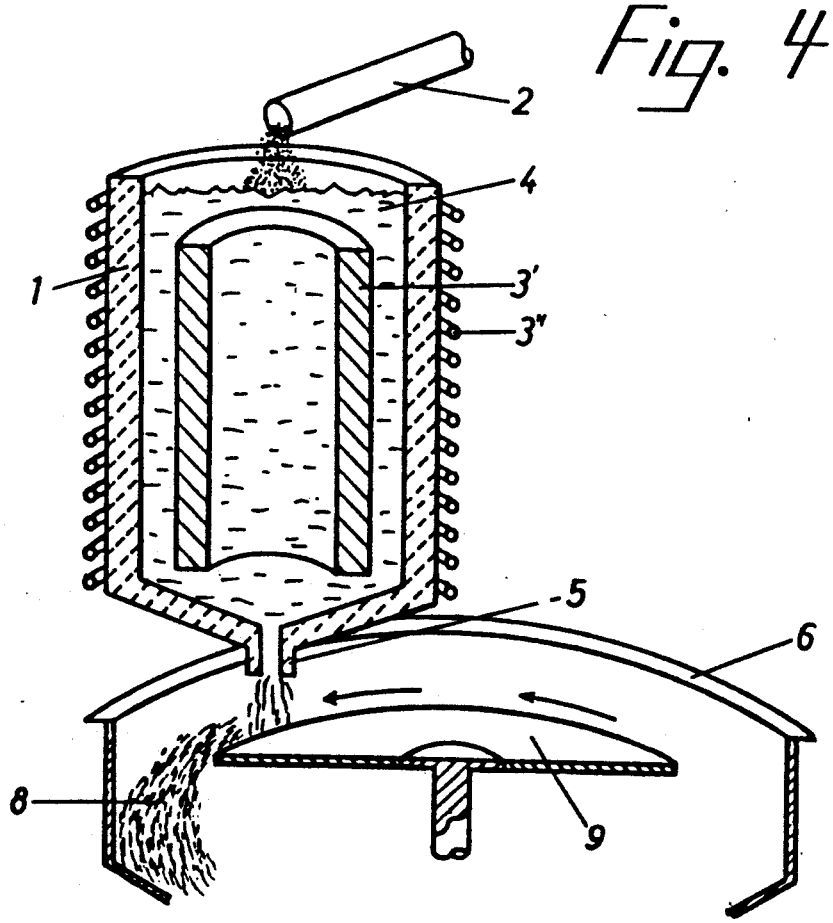

5,232,521

FLUORIDE FLUX FOR ALUMINUM BRAZING

BACKGROUND OF THE INVENTION

This invention relates to a flux which is employed when parts made of an aluminum alloy are brazed into an article by means of a metallic solder, and especially such a flux which is made of fluorides only and is noncorrosive as it does not contain any chloride.

It has been known that it is advantageous to employ, in brazing aluminum parts, a flux which is composed of fluorides but does not contain any chloride, because its residues are insoluble in water and therefore the aluminum parts so brazed will scarcely be corroded even when they are not washed in water. Hence, in comparison with a traditional brazing method which employs a chloride flux and accordingly absolutely needs washing of aluminum parts in water after they have been brazed and also needs the treatment of waste water, a brazing method with a fluoride flux is become more popular, since this method can save the expense for removing water pollutants.

However, said latter method is accompanied with drawbacks that when aluminum parts contain Mg of more than 0.5%, conventional fluoride fluxes produce a magnesium fluoride having a high melting point, whereby it becomes impossible to braze them with aluminum solders, because they have a melting point lower than that of magnesium fluorides. Although it has been reported that aluminum alloy parts containing Mg can be brazed with the employment of cesium fluorides as a flux, such brazing does not seem practical, because cesium fluorides are extremely expensive.

In view of the above background, it is an object of this invention to provide a noncorrosive flux which is economically employable for brazing aluminum alloy parts contained with Mg.

BRIEF SUMMARY OF THE INVENTION

This invention provides a flux in a form of mixture, eutectic, or powders which is consisted of 39-49.5% of potassium fluorides (KF), 44.5-49.75% of aluminum fluorides ($AlF_3$), and 0.75-16.5% of lithium fluorides (LiF), the percentages being molar percentages of each inorganic fluoride compounds.

Lithium ions contained in the flux prevent the production of magnesium fluorides so that the flux made in accordance with this invention can be used for brazing parts made of aluminum alloys containing magnesium. The molar percentages of each of the above-mentioned constituent compounds afford for their mixtures or eutectics to have a melting point suitable as a flux for brazing aluminum parts. The aforementioned percentages of LiF are to assure the present flux of such melting point, and also to assure LiF of the function for preventing the production of magnesium fluorides.

The flux in accordance with this invention can not easily be prepared by conventional methods. That is, it is preferable to prepare the flux by a dry process rather than by a wet process which utilizes a water solution. However, when KF and $AlF_3$ are melted in a mettalic or ceramic vessel by the dry process, the vessel will be broken down or melted in a short period of time, as molten inorganic fluorides of a high density erode the vessel vigorously. In order to avoid such mischief, a graphite crucible was used by the present inventors to prepare the flux of this invention. When the crucible was heated from the outside, it collapsed in a short period of time into a molten salt, as clay and silicate which had been employed in the crucible as a binding agent of graphite, were melted by molten fluorides.

However, it has been discovered by the present inventors that when the graphite crucible was heated by an electrically energized heating source which was placed within the crucible, fluoride compounds were melted well to produce the flux of this invention successfully without damaging the crucible. The molten fluorides were atomized into a powdered flux by subjecting them to an inert gas flow under a high pressure, or were solidified by cooling them first and then pulverized into a powdered flux.

Thus, it is another object of this invention to provide a novel method for preparing a flux by fluorides and by a dry process which does not employ a water solution and accordingly does not require specific treatment of waste water in order to avoid the pollution problem.

BRIEF DESCRIPTION OF THE DRAWING

FIG. 3 is an explanatory perspective view showing a preferred apparatus for preparing the flux in accordance with this invention, and FIG. 4 is an explanatory sectional view of another apparatus for preparing the flux in accordance with this invention.

DETAILED DESCRIPTION

Figure 1:
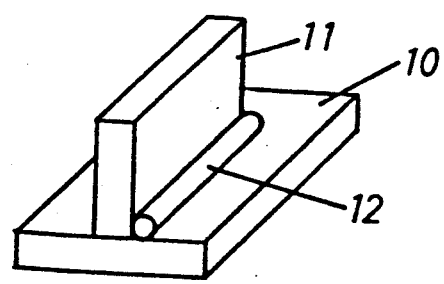
FIG. 1 is an explanatory perspective view of a test assembly used in the following examples.

This invention is explained below further in detail and more concretely in the following examples and with reference to the accompanying drawing.

EXAMPLE 1

Into a box-like crucible 1 shown in FIG. 3, having a width of 15 cm, length of 30 cm, and depth of 10 cm and made of pure graphite, there was supplied by a tubular conveyor 2 each of flux constituent compositions No. 1, No. 2, and No. 3 of the following Table 1.

When an electric load was charged between a bottom of the graphite crucible and graphite electrodes 3,3 which are suspended in the crucible so as to touch with the bottom, heat was generated at the bottoms of the electrodes, whereby the compositions were respectively melted at a temperature of about 560° C. Surfaces of the compositions were covered by a $N_2$ atmosphere. This liquidified salts 4 were taken out from the crucible through a tube 5, and were introduced into a spray column 6 where the salts were subjected to $N_2$ gas jetted out from a tube 7 whereby they became, as denoted by numeral 8, powdered fluxes having a particle size of less than 30 μ.

EXAMPLE 2

In an axial center of a tubular graphite crucible 1 shown in FIG. 4 and having an inner diameter of 20 cm, depth of 40 cm, and thickness of 2.5 cm, there was suspended a ferric tube 3' having an inner diameter of 13 cm, outer diameter of 18 cm, and height of 35 cm. Induction coils 3" which surrounded the outer wall of the graphite crubible 20 were applied with electric currents, whereby the ferric tube 3' generated heat to melt flux constituent compositions. The compositions introduced into the crucible by a tubular conveyor 2 were respectively flux compositions No. 4, No. 5, and No. 6 of the Table 1.

Each of the compositions 4 which had been melted in the crucible at about 580° C., was discharged through a bottom hole 5 onto a rotating disk 9 covered by a column roof 6. The compositions became into coarse particles 8 on account of the centrifugal force exerted on them. The particles were further pulverized by a ball mill into fine powders of less than 30 μ.

In order to confirm that the fluxes made in accordance with this invention were effectively workable for brazing aluminum articles, tests were conducted as follows.

Test pieces were as shown in FIG. 1. That is, each piece was consisted of a bottom plate 10 and a vertical plate 11, each having a thickness of 3 mm, width of 25 mm, and length of 55 mm. The two plates were assembled into an inverted T shape and brazed by an aluminum alloy solder 12 along their joints.

The plates 10, 11 employed in the tests were made of JIS-A3003 (aluminum alloy without Mg), JIS-A6063 (aluminum alloy with Mg of more than 0.5 weight %), or JIS-A6061 (aluminum alloy with Mg of more than 0.5 weitht %).

The test pieces were sprayed with the flux which had been made in accordance with this invention and made to a slurry. Then, they were placed into a furnace with a $N_2$ atmosphere, heated to a temperature of 603–605° C. for 3 minutes, and discharged from the furnace and cooled. The joints of the two plates had fine and strong fillets to show that they were satisfactorily fillet welded.

Brazing results are shown in the following Table 1.

TABLE 1

| Flux No. | Compositions (molar %) | | | Melting point of flux (°C.) | Welding results Materials of plates | | |
| --- | --- | --- | --- | --- | --- | --- | --- |
| | KF | AlF$_3$ | LiF | | A3003 | A6063 | A6061 |
| (Example 1) | | | | | | | |
| 1 | 49.50 | 49.75 | 0.75 | 550 | Excellent | Excellent | Good |
| 2 | 47.50 | 48.75 | 3.75 | 560 | Excellent | Excellent | Good |
| 3 | 45.00 | 47.50 | 7.50 | 565 | Excellent | Excellent | Excellent |
| (Example 2) | | | | | | | |
| 4 | 41.00 | 45.50 | 13.50 | 570 | Excellent | Excellent | Excellent |
| 5 | 40.00 | 45.00 | 15.00 | 570 | Excellent | Excellent | Excellent |
| 6 | 39.00 | 44.50 | 16.50 | 580 | Excellent | Excellent | Excellent |

As shown in the above Table 1, brazing results by the employment of the fluxes made in accordance with this invention were excellent not only for articles made of aluminum alloys without Mg but also for those made of aluminum alloys containing Mg.

In order to examine insolubility of the fluxes of this invention, the plates which had brazed with the No. 3 flux and had not been washed in water, were cut to small pieces, and immersed into ion-exchange water of 40° C. The amount of said ion-exchange water was such that should the total amount of the flux sprayed onto the plates be dissolved into the ion-exchange water, the flux would be 20% concentration of the water. The more a concentration is high, the more electrical conductivity of the water becomes large.

Plates made of materials and having dimensions same to those of No. 3 but brazed with noncorrosive fluxes (A), (B), (C), and (D) which were very common in the market, were cut likewise to small pieces and immersed into ion-exchange water.

Figure 2:
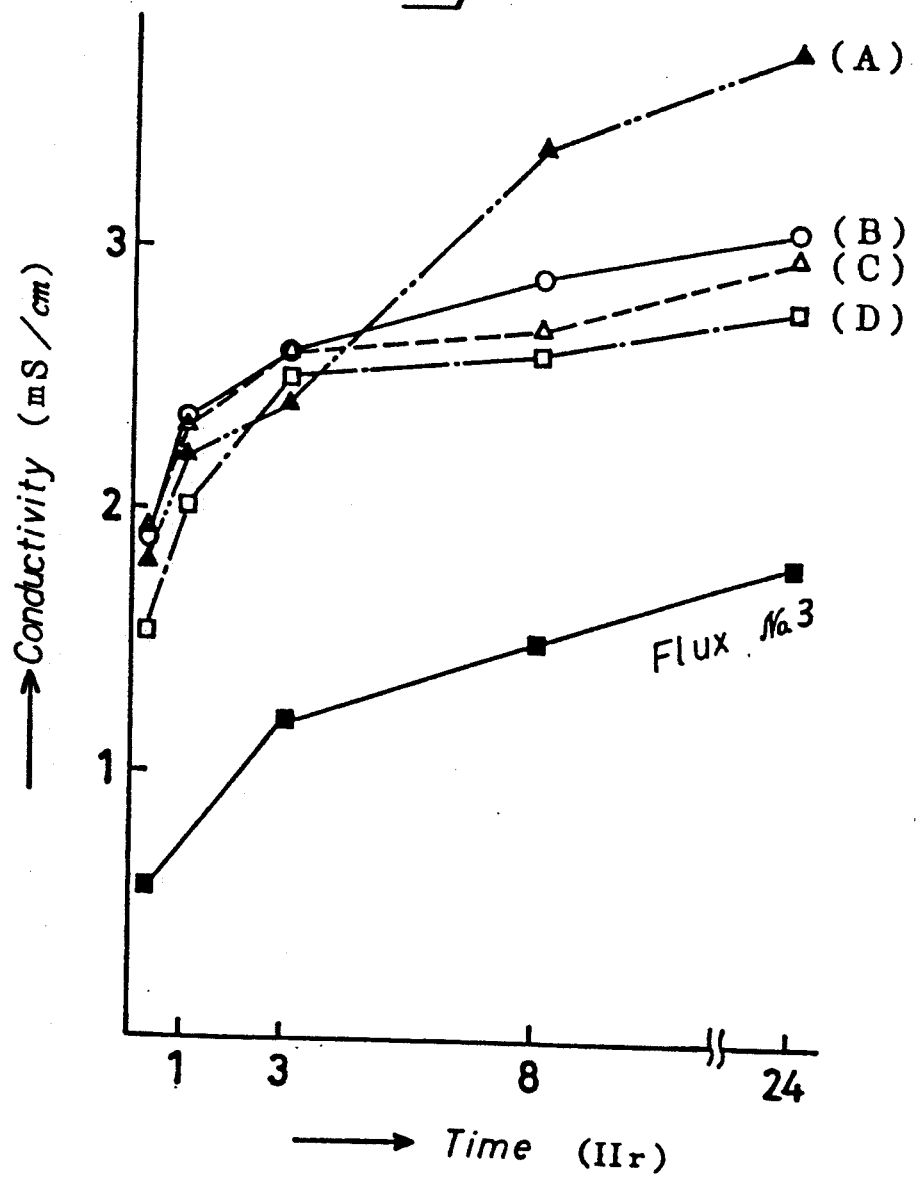
FIG. 2 is a graph showing differences of electrical conductivites of the flux made in accordance with this invention and of conventional fluxes which are most commonly available in the market.

In FIG. 2, changes of their conductivities with the lapse of time are shown.

It is thus proven that the fluxes made in accordance with this invention are extremely insoluble to water, and they are accordingly extremely noncorrosive, while as mentioned above, they are very efficiently workable for brazing aluminum alloys with Mg.

We claim:

1. A fluoride flux having a melting point of less than 600° C. for use with the brazing of aluminum alloy parts containing Mg, which is an eutectic mixture of KF of 39–49.5%, AlF$_3$ of 44.5–49.75%, and LiF of 0.75–16.5%, said percentages being molar percentages of each of the above inorganic fluoride compounds.

2. A method of preparing a fluoride flux which comprises melting inorganic fluoride compounds in a graphite vessel by means of heating elements located within the graphite vessel, cooling the melted compounds, and causing the cooled compounds to become powdered.

* * * * *